US010717049B2

(12) United States Patent
Matsuda et al.

(10) Patent No.: US 10,717,049 B2
(45) Date of Patent: Jul. 21, 2020

(54) MEMBRANE ELEMENT AND MEMBRANE ELEMENT END MEMBER USED IN SAME

(71) Applicant: NITTO DENKO CORPORATION, Osaka (JP)

(72) Inventors: Hideki Matsuda, Osaka (JP); Shinichi Chikura, Osaka (JP); Yasuhiro Uda, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 20 days.

(21) Appl. No.: 16/066,200

(22) PCT Filed: Dec. 20, 2016

(86) PCT No.: PCT/JP2016/087887
§ 371 (c)(1),
(2) Date: Jun. 26, 2018

(87) PCT Pub. No.: WO2017/115691
PCT Pub. Date: Jul. 6, 2017

(65) Prior Publication Data
US 2019/0009220 A1 Jan. 10, 2019

(30) Foreign Application Priority Data
Dec. 28, 2015 (JP) .................. 2015-256507

(51) Int. Cl.
B01D 63/12 (2006.01)
B01D 63/10 (2006.01)
(Continued)

(52) U.S. Cl.
CPC ............ *B01D 63/12* (2013.01); *B01D 61/18* (2013.01); *B01D 63/068* (2013.01); *B01D 63/106* (2013.01); *B01D 2313/04* (2013.01)

(58) Field of Classification Search
None
See application file for complete search history.

(56) References Cited

U.S. PATENT DOCUMENTS

2005/0057002 A1  3/2005  Chikura et al.
2006/0049093 A1  3/2006  Chikura et al.
(Continued)

FOREIGN PATENT DOCUMENTS

CN  102407041 A  4/2012
CN  102949884 A  3/2013
(Continued)

OTHER PUBLICATIONS

International Search Repport issued in PCT/JP2016/087887, dated Feb. 28, 2017.
(Continued)

Primary Examiner — Chester T Barry
(74) Attorney, Agent, or Firm — Greenblum & Bernstein, P.L.C.

(57) ABSTRACT

A membrane element includes a central pipe having, in its outer periphery, holes; a membrane wound body in which a membrane member is wound on the central pipe; end members arranged, respectively, at both ends of the membrane wound body; and an exterior member fitted to at least an outer periphery of the membrane wound body. In this element, the exterior member includes a fiber reinforced resin having a reinforcing fiber wound on the outer periphery of the membrane wound body; the end members each includes flexible portions extended from a main body toward the membrane wound body; and the reinforcing fiber is wound also onto an outer periphery of the flexible portions in a state that the flexible portions are deformed toward an outer peripheral surface of the membrane wound body.

18 Claims, 7 Drawing Sheets

(51) Int. Cl.
*B01D 61/18* (2006.01)
*B01D 63/06* (2006.01)

(56) References Cited

U.S. PATENT DOCUMENTS

| | | | |
|---|---|---|---|
| 2011/0084013 A1 | 4/2011 | Lesan et al. | |
| 2011/0084455 A1* | 4/2011 | Elwell | B01D 63/106 277/312 |
| 2012/0037562 A1 | 2/2012 | Beppu et al. | |
| 2013/0270172 A1 | 10/2013 | Elwell et al. | |
| 2014/0151279 A1 | 6/2014 | Banks | |
| 2014/0299533 A1 | 10/2014 | Elwell et al. | |

FOREIGN PATENT DOCUMENTS

| | | |
|---|---|---|
| JP | 53-9356 U1 | 1/1978 |
| JP | 53-69440 U1 | 6/1978 |
| JP | 59-24101 | 2/1984 |
| JP | 11-156165 | 6/1999 |
| JP | 2005-111473 | 4/2005 |
| JP | 2005-313156 A | 11/2005 |
| JP | 2010-194406 | 9/2010 |
| JP | 2012-183464 | 9/2012 |
| JP | 2013-507242 | 3/2013 |
| WO | 2011/046937 | 4/2011 |

OTHER PUBLICATIONS

Notice of Reasons of Refusal received in Japanese Patent Application No. 2015-256507, dated Sep. 3, 2019.
Foreign Office Action issued in JP Patent Application No. 2015-256507 and English language translation, dated Jan. 7, 2020.

* cited by examiner

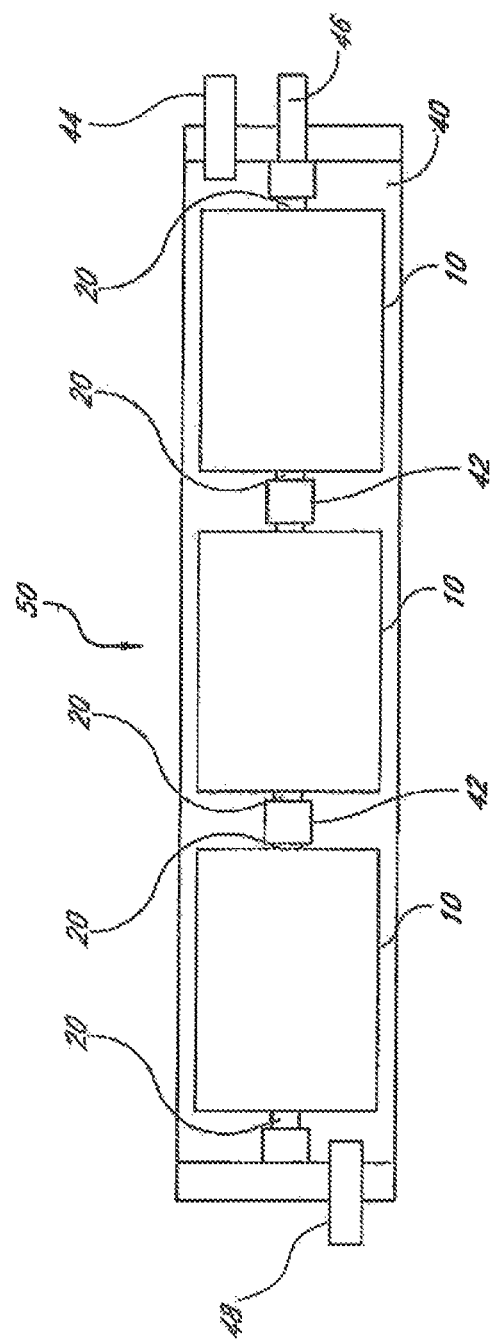

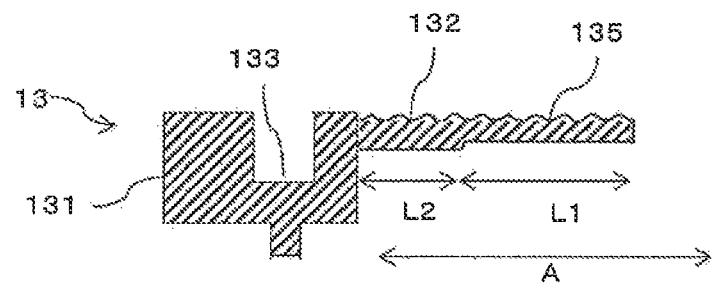
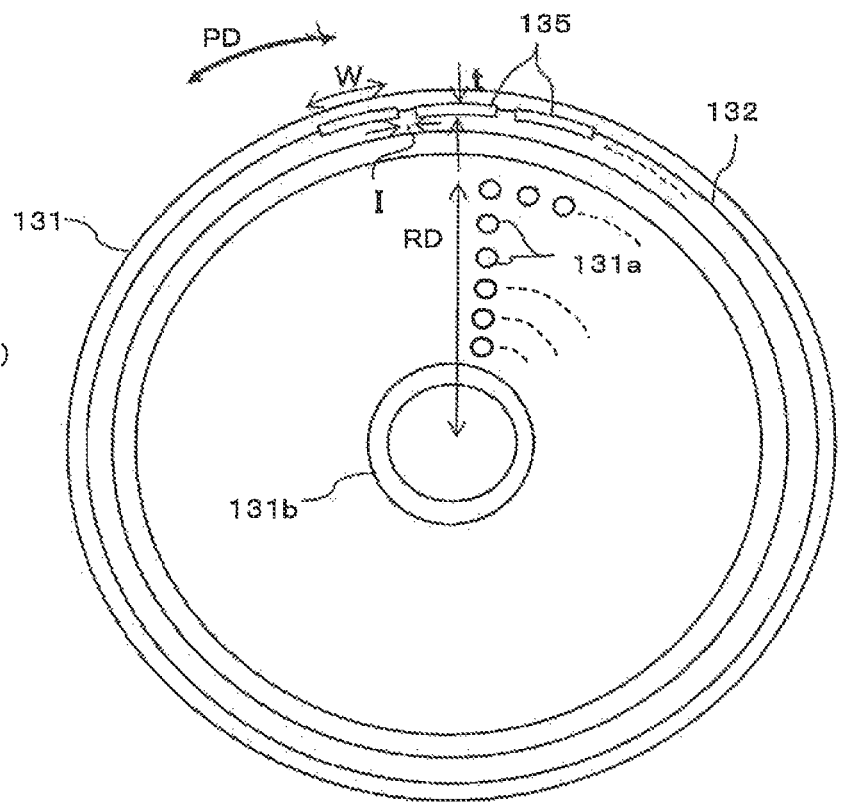
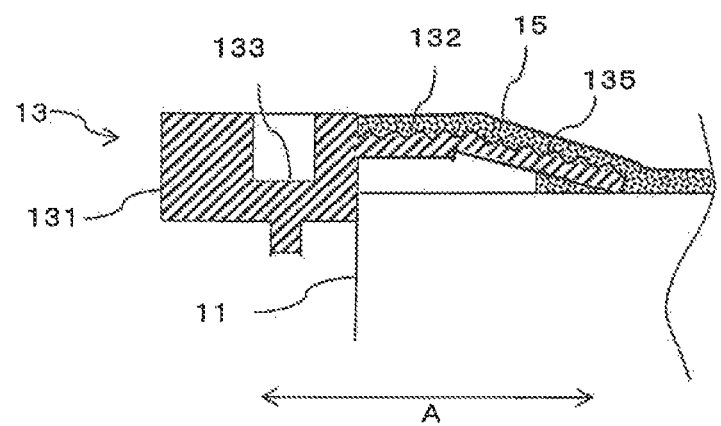

MEMBRANE ELEMENT AND MEMBRANE ELEMENT END MEMBER USED IN SAME

TECHNICAL FIELD

The present invention relates to a spiral membrane element having an exterior member including a fiber reinforced resin, and a membrane element end member used in this element.

BACKGROUND ART

As an example of a membrane filtration apparatus for filtrating a raw liquid through a membrane element to produce a permeated liquid, known is a membrane filtration apparatus equipped with a membrane element having a membrane wound body formed by winding a membrane member, and with a pressure-resistant vessel in which this membrane element is accommodated.

A membrane wound body in the membrane filtration apparatus of this type is formed by winding a membrane member up. Thus, the membrane member may be shifted out of position into the axial line direction by pressure in the axial line direction that is received from, for example, a raw liquid flowing the pressure resistant vessel, so that the membrane wound body may be deformed into a telescope form. Against such a problem, a technique is known in which an end member (so-called telescope preventing member) is fitted to an end surface of the membrane wound body to face an end surface of the body, thereby preventing the membrane member from being shifted into the axial line direction (Patent Document 1 listed below).

An exterior member is laid onto the outer periphery of the membrane element. This exterior member is fitted thereto so as to stride across the outer periphery of the membrane wound body, and a portion of the telescope preventing member. As described in Patent Document 2, in this case, the exterior member is generally formed by winding a glass fiber to which an adhesive is applied (glass fiber roving) onto the outer periphery of the membrane wound body.

Also, as described in Patent Document 1, conventionally, the following types exist as the telescope preventing member: a type of having, at a portion of the member to which the membrane wound body is butted, a cylindrical moiety (skirt) into which the membrane wound body is fitted; and a type of not having such a cylindrical moiety.

However, according to the former type, it is necessary to control the outside diameter of the membrane wound body at a high precision to be matched with the inside diameter of the cylindrical moiety. Moreover, the outside diameter of the membrane wound body is restricted so that a limitation is imposed onto an increase of the membrane in area. Thus, the latter type, which has no cylindrical moiety, is becoming the mainstream. However, the latter type has a problem that at the time of the winding the glass fiber roving, the glass fiber roving is depressed down at the boundary between the membrane wound body and the end member.

For this reason, Patent Document 3 suggests a telescope preventing member in which, at its portion to be butted to an end member, plural protrusions are circularly located to prevent the glass fiber roving from being depressed down.

PRIOR ART DOCUMENTS

Patent Documents

Patent Document 1: JP-A-2005-111473
Patent Document 2: JP-A-2010-194406
Patent Document 3: JP-A-2012-183464

SUMMARY OF THE INVENTION

Problems to be Solved by the Invention

In telescope preventing member described in Patent Document 3, however, when the outside diameter of the membrane wound body is large relatively to the position of the circularly formed protrusions, the glass fiber roving cannot be sufficiently prevented from being depressed down. Moreover, steps between the telescope preventing member and the membrane wound body may cause a winding poorness.

Reversely, when the outside diameter of the membrane wound body is smaller relatively to the position of the circularly formed protrusions, the winding of the glass fiber roving becomes uneven (large gaps are partially generated), in particular, near tips of the protrusions. At the positions, there is caused a problem that the adhering strength of the exterior member is lowered. In any one of these cases, the circularly formed protrusions decrease the effect of heightening the adhering strength of the exterior member.

Thus, an object of the present invention is to provide a membrane element end member about which even when the outside diameter of the membrane wound body is somewhat changed, the depression of the reinforcing fiber and the winding poorness thereof can be prevented while the adhering strength of the exterior member can be reinforced; and a membrane element having this end member.

Means for Solving the Problems

The object of the present invention is attained by the present invention that produces effects and advantages as described later.

The membrane element of the present invention is a membrane element including a central pipe having, in its outer periphery, holes; a membrane wound body in which a membrane member is wound on the central pipe; end members arranged, respectively, at both ends of the membrane wound body; and an exterior member fitted to an outer periphery of the membrane wound body; wherein the exterior member includes a fiber reinforced resin having a reinforcing fiber wound on the outer periphery of the membrane wound body; the end members each includes a main body having an opening through which a liquid can flow, and plural flexible portions extended from the main body toward the membrane wound body; and the reinforcing fiber is wound also onto an outer periphery of the flexible portions in a state that the flexible portions are deformed toward an outer peripheral surface of the membrane wound body.

In the membrane element of the present invention, the end members each have the plural flexible portions extended from the main body toward the membrane wound body. Thus, when the exterior member is formed, the reinforcing fiber can be effectively prevented from being depressed into between end surfaces of the membrane wound body and the main body. Moreover, the reinforcing fiber is wound also onto the outer periphery of the flexible portions in the state that the flexible portions are deformed toward the outer peripheral surface of the membrane wound body; thus, even when the outside diameter of the membrane wound body is somewhat changed, the winding poorness can be prevented, which is based on the steps between the end members and the outer peripheral surface of the membrane wound body. At this time, the flexible portions are bonded to the exterior member to be integrated with the exterior member, so that the adhering strength can be reinforced. As a result, a membrane element end member can be provided about which even when the outside diameter of the membrane wound body is somewhat changed, the depression of the reinforcing fiber and the winding poorness thereof can be prevented while the adhering strength of the exterior member can be reinforced.

In the membrane element, it is preferred that the main body of each of the end members has a cover moiety which covers an end of the membrane wound body, and which has a larger inside diameter than an outside diameter of the membrane wound body, and further the flexible portions are extended from the cover moiety. When the end member has this cover moiety, the reinforcing fiber can be prevented, with a high certainty, from being depressed into between end surfaces of the membrane wound body and the main body. Consequently, the end members can be more strongly bonded to and integrated with the membrane wound body by the exterior member.

The flexible portions preferably have, in their outer peripheral side surface, a convexity and concavity. The matter that the flexible portions each have, in the outer peripheral side surface thereof, the convexity and concavity does not make it easy that, when the reinforcing fiber is wound thereonto, the fiber is shifted out of position. Thus, the fiber can be more evenly wound. When the convexity and concavity is, in particular, a groove extended in a peripheral direction, the reinforcing fiber can be more evenly wound while the exterior member ensures a sufficient adhering strength.

Intervals between the flexible portions are each preferably smaller than a width of each of the flexible portions in a peripheral direction thereof. This structure makes it possible to cover many areas of the outer periphery of the membrane wound body, wind the reinforcing fiber more evenly, and also enhance the effect of reinforcing the adhering strength of the exterior member.

Furthermore, it is preferred that the flexible portions are arranged at 10 sites or more at substantially regular intervals. This structure makes the width of the flexible portions relatively small in the peripheral direction, so that the portions easily ensure flexibility in the radius direction. The setup of the flexible portions at 10 sites or more at substantially regular intervals makes it possible to wind the reinforcing fiber more evenly and also enhance the effect of reinforcing the adhering strength of the exterior member.

The membrane element end member of the present invention is a membrane element end member which is used in the membrane element recited in any one of the above-mentioned paragraphs concerned. This end member includes a main body having an opening through which a liquid can flow, and plural flexible portions extended from the main body toward the membrane wound body.

The membrane element end member of the present invention has the plural flexible portions extended from the main body toward the membrane wound body; thus, the end member makes it possible that even when the outside diameter of the membrane wound body is somewhat changed, the depression of the reinforcing fiber and the winding poorness are prevented while the adhering strength of the exterior member is reinforced.

Another membrane element end member of the present invention is a membrane element end member which is arranged at an end of a spiral membrane element, the end member including plural flexible portions extended toward a membrane wound body of the membrane element.

This membrane element end member has the plural flexible portions extended toward the membrane wound body of the membrane element. As described above, therefore, the end member makes it possible that even when the outside diameter of the membrane wound body is somewhat changed, the depression of the reinforcing fiber and the winding poorness are prevented while the adhering strength of the exterior member can be reinforced.

In the membrane element, it is preferred that the main body of each of the end members has a cover moiety which covers an end of the membrane wound body, and which has a larder inside diameter than an outside diameter of the membrane wound body, and further the flexible portions are extended from the cover moiety.

When the end member has this cover moiety, the reinforcing fiber can be prevented, with a high certainty, from being depressed into between end surfaces of the membrane wound body and the main body. Consequently, the end members can be more strongly bonded to and integrated with the membrane wound body by the exterior member.

The flexible portions preferably have, in their outer peripheral side surface, a convexity and concavity. The matter that the flexible portions each have, in the outer peripheral side surface thereof, the convexity and concavity does not make it easy that, when the reinforcing fiber is wound thereonto, the fiber is shifted out of position. Thus, the fiber can be more evenly wound. When the convexity and concavity is, in particular, a groove extended in a peripheral direction, the reinforcing fiber can be more evenly wound while the exterior member ensures a sufficient adhering strength.

Intervals between the flexible portions are each preferably smaller than a width of each of the flexible portions in a peripheral direction thereof. This structure makes it possible to cover many areas of the outer periphery of the membrane wound body. Consequently, the depression of the reinforcing fiber and the winding poorness can be more effectively prevented while the effect of reinforcing the adhering strength of the exterior member can be further made higher.

Furthermore, it is preferred that the flexible portions are arranged at 10 sites or more at substantially regular intervals. This structure makes the width of the flexible portions relatively small in the peripheral direction, so that the portions easily ensure flexibility in the radius direction. The setup of the flexible portions at 10 sites or more at substantially regular intervals makes it possible to wind the reinforcing fiber more evenly and also enhance the effect of reinforcing the adhering strength of the exterior member.

BRIEF DESCRIPTION OF THE DRAWINGS

FIG. 1 is a schematic sectional view illustrating an example of a membrane filtration apparatus having membrane elements of the present invention.

FIGS. 2(a) and 2(b) are, respectively, an exploded perspective view of the example, and a perspective view illustrating any one of its end members.

FIGS. 4(a) to 4(c) illustrate an example of a main region of the membrane element; and FIG. 4(a) is a vertically sectional view of a main region of the end member before fitting, FIG. 4(b) is a right side view of the whole of the end member before fitting, and FIG. 4(c) is a vertically sectional view of a periphery of the end member after fitting.

NODE FOR CARRYING OUT THE INVENTION

Figure 2A:
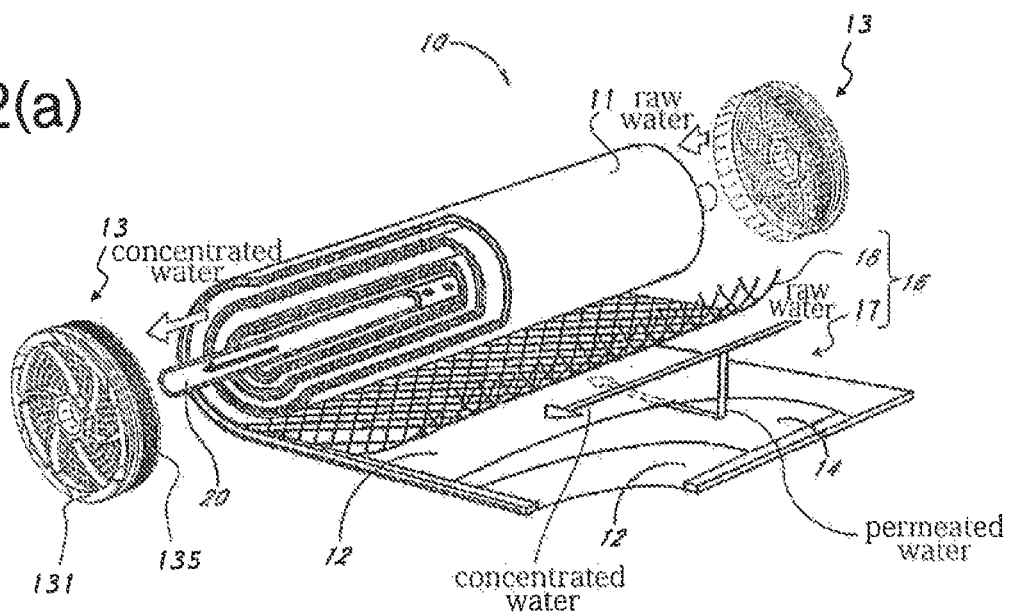
FIGS. 2(a) and 2(b) are each a perspective view illustrating an example of any one of the membrane elements.
Figure 2B:
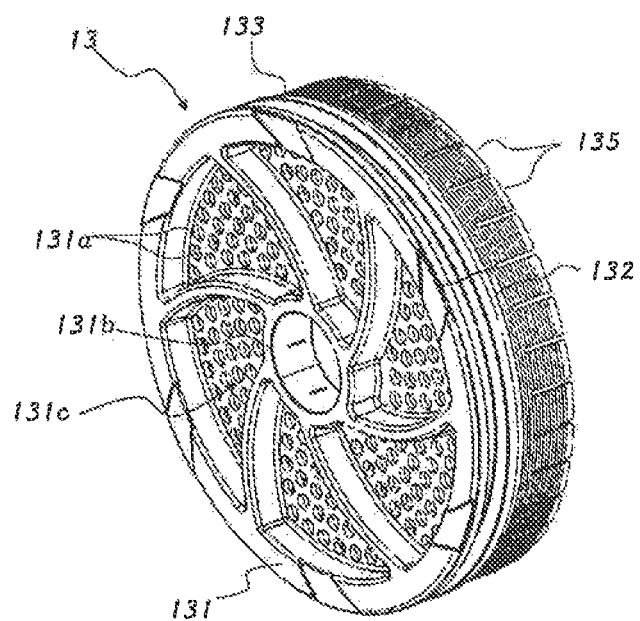

FIG. 1 is a schematic sectional view illustrating an example of a membrane filtration apparatus 50 having membrane elements 10 according to an embodiment of the present invention. FIGS. 2(a) to 2(b) are, respectively, an exploded perspective view of any one of the membrane elements 10 and a perspective view illustrating any one of its end members 13. In the illustrated example, the membrane filtration apparatus 50 is formed by arranging the membrane elements 10 straightly inside a pressure resistant vessel 40.

The pressure resistant vessel 40 is a cylindrical body made of resin or some other, and is made of, for example, an FRP (fiberglass reinforced plastic). Inside this pressure resistant vessel 40, along the axial line direction thereof, the membrane elements 10 are arranged side by side. At one out of two ends of the pressure resistant vessel 40, a raw water inflow opening 48 is made through which a raw water (raw liquid) such as waste water and seawater flows into the vessel. Through the raw water inflow opening 48, the raw water flowing thereinto under a predetermined pressure is filtrated through the membrane elements 10 to yield clarified permeated water (permeated liquid) and a concentrated water (concentrated liquid), which is the raw water after the filtration. At the other end of the pressure resistant vessel 40, the following are made: a permeated water outflow opening 46 through which the permeated water flows out; and a concentrated water outflow opening 44 through which the concentrated water flows out.

As illustrated in FIG. 2(a), any one of the membrane elements 10 is equipped with a central pipe 20 having, in its outer periphery, holes; a membrane wound body 11 in which a membrane member 16 is wound onto the central pipe 20; and the end members 13, which are arranged, respectively, at both the ends of the membrane wound body 11. Furthermore, the membrane element 10 is further equipped with an exterior member 15 (see FIG. 3) laid onto at least the outer periphery of the membrane wound body 11.

The membrane member 16 is, for example, a member including separating membranes 12, a supply-side flow-channel matter 18, and a permeation-side flow-channel matter 14. In the present embodiment, a description will be made about an example of an RO (reverse osmosis) membrane element in which the separating membranes 12 are RO membranes.

More specifically, the separating membranes 12, the number of which is two, having the same rectangular shape are put, respectively, onto both surfaces of the permeation-side flow-channel matter 14 which is a netlike member made of resin and has a rectangular shape. Furthermore, at their three sides, they are bonded to each other so that a baglike membrane member 17 is formed which has, at one side thereof, an opening. Instead of the use of the two separating membranes 12, a single separating membrane 12 is folded down at the center thereof to put halves thereof, respectively, onto both surfaces of the permeation-side flow-channel matter 14. In this way, a baglike membrane member 17 may be formed in which at their two sides, the halves are bonded to each other. The opening in this baglike membrane member 17 is fitted to the outer peripheral surface of the central pipe 20, and this member is wound, together with the supply-side flow-channel matter 18, which is the netlike member made of resin, onto the periphery of the central pipe 20. In this way, the membrane element 10 is formed. The separating membranes 12 are each formed, for example, by laminating a porous support and a skin layer (dense layer) successively onto a nonwoven fabric layer.

When a raw water is supplied into the membrane element through one of the ends of the membrane element 10 formed as described above, the raw water permeates the inside of the membrane element 10 through a raw water flow channel which is constituted by the supply-side flow-channel matter 18 functioning as a raw water spacer. At this time, the raw water is filtrated through the separating membranes 12, and the permeated water, which has been filtrated from the raw water, infiltrates into a permeated water flow channel which is constituted by the permeation-side flow-channel matter 14 functioning as a permeated water spacer.

Thereafter, the permeated water which has infiltrated into the permeated water flow channel flows through the permeated water flow channel toward the central pipe 20 to be introduced into the central pipe 20 through the plural water-passing holes made in the outer periphery of the central pipe 20. In this way, the permeated water flows out through the central pipe 20 from the other end side of the membrane element 10, and further the concentrated water flows out through the raw water flow channel, which is constituted by the supply-side flow-channel matter 18.

As illustrated in FIG. 1, about the membrane elements 10 accommodated in the pressure resistant vessel 40, the central pipes 20 of any adjacent two of these membrane elements 10 are connected to each other through an interconnector 42. This interconnector 42 constitutes an attachment which can be attached onto and detached from the central pipes 20 of the membrane elements 10. Accordingly, the raw water which has flowed in through the raw water inflow opening 48 flows in the raw water flow channel from the membrane element 10 near the raw water inflow opening 48 in turn toward other membrane elements. The permeated water which has been filtrated from the raw water through the individual membrane elements 10 flows out from the permeated water outflow opening 46 through the central pipes 20 connected to the interconnectors 42, these pipes being in the form of a single pipe. In the meantime, the raw water passes through the raw water flow channels of the individual membrane elements 10 so that the permeated water is filtrated away and the raw water is concentrated. The resultant concentrated water flows out through a concentrated water outflow opening 44.

The membrane filtration apparatus 50 is not limited to a structure in which the membrane elements 10 are accommodated in the pressure resistant vessel 40. Thus, the apparatus may have a structure in which only one of the membrane elements 10 is accommodated in the pressure resistant vessel 40. Each of the membrane elements 10 is not limited to any RO membrane element in which an RO membrane is used. Thus, the membrane element may be a membrane element that may be of various types, such as an MF (membrane filter) membrane element or a UF (ultra filter) membrane element.

Figure 3:
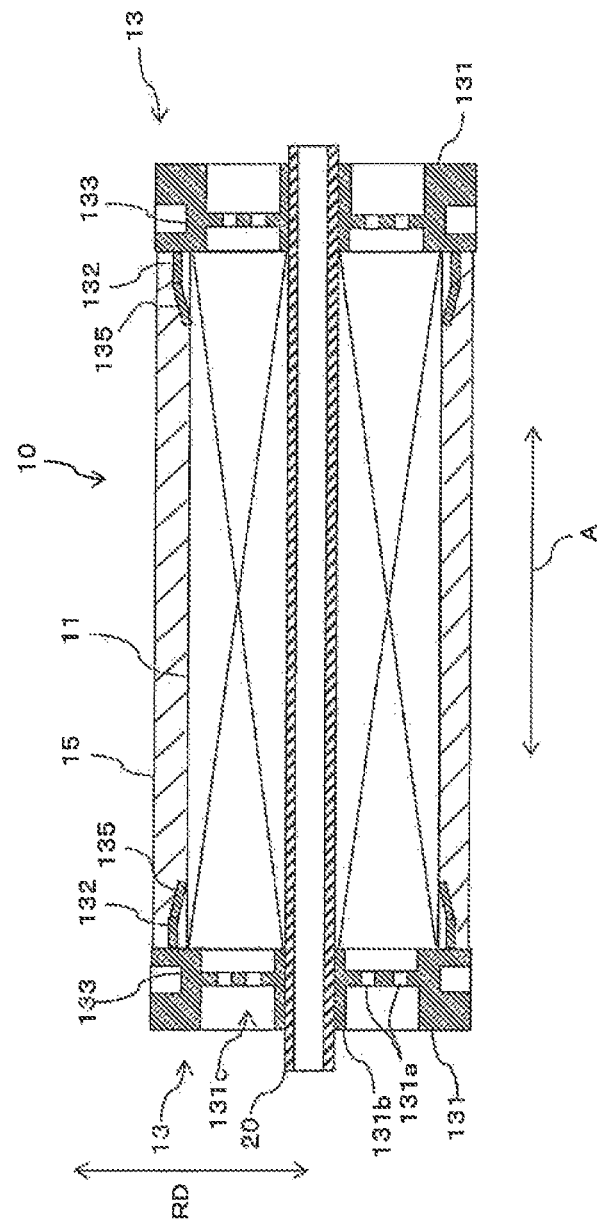
FIG. 3 is a schematic sectional view illustrating an internal structure of any one of the membrane elements.

FIG. 3 is a schematic sectional view illustrating an internal structure of any one of the membrane elements 10. The membrane member 16 wound spirally as described above constitutes the cylindrical membrane wound body 11, and the end members 13 and the exterior member 15 are fitted to the membrane wound body 11. In this way, the membrane element 10 is formed.

The end members 13 are arranged, respectively, at the ends of the membrane wound body 11 in the axial line direction A thereof, and are membrane element end members in order to prevent the membrane member 16 (see FIG. 2(*a*)) from being shifted out of position in the axial line direction A. In this example, the end members 13 in the present invention are arranged, respectively, at both the ends of the membrane wound body 11 in the axial line direction thereof. However, this system is not limited to such a structure. Thus, the system may have a structure in which one of the end members 13 is located at only one of the ends of the membrane wound body. Each of the end members 13 may be called a telescope preventing member or a seal carrier, and can also have a function of preventing the membrane wound body from being telescoped, or a function of holding a seal.

As illustrated in FIG. 2(*b*) to FIG. 3, each of the end members 13 has an opening 131*a* through which a liquid can flow, and has a main body 131 facing an end surface of the membrane wound body 11. Moreover, the main body 131 has a circular portion 131*b* into which the central pipe 20 is inserted, and a connecting portion 131*c* for connecting this. Furthermore, the end member 13 has plural flexible portions 135 which are extended from a position of the main body 131 that is at the outer peripheral side of the membrane wound body 11 toward the membrane wound body 11, and which have flexibility in at least the radius direction RD. In the present embodiment, the flexible portions 135 are fitted to the main body 131 to interpose a cover moiety 132 therebetween. However, the flexible portions 135 may be fitted to the main body 131 not to interpose the cover moiety 132 therebetween (see FIG. 5(*a*)). The cover moiety 132 is extended from the main body 131 toward the membrane wound body 11 along the axial line direction A (see FIG. 3) of the membrane wound body 11. It is preferred that the main body 131, the flexible portions 135, and the cover moiety 132 have a structure of being formed to be integrated with each other. The material of the end member 13 is, for example, a resin such as ABS, a product Noryl (registered trade name; modified PPE resin), or PVC. As described just above, it is preferred in the present invention that the main body 131 of the end member 13 has the cover moiety 132, which covers one of the two ends of the membrane wound body 11 and has a larger inside diameter than the outside diameter of the membrane wound body 11.

The main body 131 of the end member 13 is formed into, for example, the form of a disc that is larger in outside diameter than the corresponding end surface of the membrane wound body 11. In the outer peripheral surface of the main body 131, a circular concavity 133 is made in which a packing (not illustrated) is to be accommodated to be held. In the state that the packing is fitted into this circular concavity 133, the membrane element 10 is arranged inside the pressure resistant vessel 40, so that the surface of the packing contacts the inner surface of the pressure resistant vessel 40. In this way, the end member 13 also comes to function as a seal holding member (seal carrier) for holding the packing (seal).

FIG. 4 illustrate an example of a main region of any one of the membrane elements 10. FIG. 4(*a*) is a vertically sectional view of a main region of any one of the end members 13 before fitting, FIG. 4(*b*) is a right side view of the whole of the end member 13 before fitting, and FIG. 4(*c*) is a vertically sectional view of a periphery of the end member 13 after fitting. As illustrated in FIG. 2(*b*), and FIGS. 4(*a*) to (*b*), the cover moiety 132 of the end member 13 protrudes into a circular ring form from the main body 131 toward the membrane wound body 11. The inside diameter thereof is larger than or substantially equal to the outside diameter of the membrane wound body 11. Before the end member is fitted to the membrane wound body, the flexible portions 135 protrude in a tongue form from the tip of the cover moiety 132 of the main body 131 toward the membrane wound body 11, and the inside diameter of the flexible portions 135 is larger than the outside diameter of the membrane wound body 11.

As illustrated in FIG. 4(*c*), after the fitting, the flexible portions 135 have flexibility in the radius direction RD, so that the flexible portions are deformed inwards in the radius direction RD to collapse down. Preferably, in the state that tips of the flexible portions 135 contact the outer periphery of the membrane wound body 11, the exterior member 15 is disposed. At this time, the end member 13 is located to bring the main body 131 into contact with the corresponding end surface of the membrane wound body 11. In this state, the exterior member 15 is located to stride across the outer periphery of the cover moiety 132, the flexible portions 135, and the outer periphery of the membrane wound body 11. Thus, the membrane wound body 11 is configured to be covered with the exterior member 15. In short, in the state that the flexible portions 135 are deformed toward the outer peripheral surface of the membrane wound body 11, in the present invention, the reinforcing fiber is wound also onto the outer periphery of the flexible portions 135.

The exterior member 15 includes a fiber reinforced resin having a reinforcing fiber wound onto the outer periphery of the membrane wound body 11, and is, for example, an FRP exterior member composed of a glass fiber and an adhesive. Along the outer peripheral surface of the membrane wound body 11, the exterior member 15 is continuously wound from one of the two end members 13 to the other end member 13 substantially in the peripheral direction PD, so that the outer periphery of the membrane wound body 11 is entirely covered. The FRP exterior member is in a state that the adhesive-containing reinforcing fiber (for example, a glass fiber roving) is wound, and further embedded in the solidified adhesive.

In the present embodiment, each of the end members 13 has the plural flexible portions 135 extended from the position of the main body 131 which is at the outer peripheral side of the membrane wound body 11 toward the membrane wound body 11; accordingly, when the exterior member 15 is formed, the depression of the reinforcing fiber can be effectively prevented. Moreover, the flexible portions 135 have flexibility at least in the radius direction RD; thus, even when the outside diameter of the membrane wound body 11 is small, the flexible portions 135 follow the outside diameter of the membrane wound body 11 to be deformed. Consequently, the winding of the reinforcing fiber can be prevented from being made poor by the above-mentioned steps. Moreover, the flexible portions 135 are bonded to the exterior member 15 to be integrated with the member in the state that the reinforcing fiber is wound thereonto. Thus, the adhering strength can be reinforced. As illustrated in FIG. 4(*c*), at this time, the adhesive infiltrates into the inner peripheral side of the flexible portions 135. Consequently, the effect of reinforcing the exterior member 15 can be made higher.

In the present embodiment, the flexible portions 135, which each have a rectangular shape when viewed in plan, are arranged at 40 sites at substantially regular intervals. The number of the flexible portions 135 is preferably from 6 to 100, more preferably from 12 to 80, even more preferably from 18 to 50. It is particularly preferred that the flexible portions 135 are arranged at 10 sites or more at substantially regular intervals. The flexible portions 135 may be formed by resin molding, using, for example, a mold.

In the present embodiment, an example has been demonstrated in which the flexible portions 135 has, in their outer peripheral side surface thereof, convexities and concavities, in which grooves are extended in the peripheral direction PD. When the flexible portions have the convexities and concavities, the depth of the concavities is preferably from 0.01 to 1.5 mm.

About such convexities and concavities, undulations may be formed by post-processing a shaped product of each of the end members 13. However, this method is large in costs. Thus, preferably, a method is adopted in which undulations are made in a mold. Examples of the method in which undulations are made in a mold include a method based on cutting processing using, for example, an NC lathe, or embossing processing; and electric discharge machining, laser machining, and blast machining.

It is preferred about the flexible portions 135 of the end member 13 that the respective widths W thereof in the peripheral direction PD are constant, and the widths W are each larger than the thickness t thereof in the radius direction RD; or the width W of these flexible portions in the peripheral direction PD is varied in the axial line direction A, and at a position of the flexible portions where the width W in the peripheral direction PD is largest, the width W is larger than the thickness t in the radius direction.

In other words, about the flexible portions 135, in their region where the thickness t in the radius direction RD is smallest, the thickness t is preferably from 0.01 to 1.5 mm, more preferably from 0.5 to 1.2 mm. In the present embodiment, an example is being demonstrated in which the flexible portions 135 have, in their outer peripheral side surface, convexities and concavities. In this case, it is preferred that the thickness t of the thinnest region of the convexities and concavities is in the above-mentioned range. When the thickness is in this range, the flexible portions favorably keep strength to some degree while the flexible portions can gain flexibility in the radius direction.

When the element is, for example, a 4-inch element, the width W of each of the flexible portions 135 is preferably from 3 to 15 mm, more preferably from 6 to 10 mm at their position where the width W is largest in the peripheral direction PD. When the element is, for example, an 8-inch element, the width W of each of the flexible portions 135 is preferably from 6 to 30 mm, more preferably from 12 to 20 mm at their position where the width W is largest in the peripheral direction PD. When the element is, for example, a 16-inch element, the width W of each of the flexible portions 135 is preferably from 12 to 60 mm, more preferably from 24 to 40 mm at their position where the width W is largest in the peripheral direction PD.

The width W is a value measured as the length of the flexible portion along the peripheral direction PD.

It is also preferred about the flexible portions 135 of the end member 13 that the respective widths W thereof in the peripheral direction PD are constant, and the widths W are each larger than each of the intervals I between the flexible portions 135; or the width W of these flexible portions in the peripheral direction PD is varied in the axial line direction A, and at a position of the flexible portions where the width W in the peripheral direction PD is largest, the width W is larger than each of the intervals I between the flexible portions 135. Specifically, when the element is, for example, a 4-inch element, at the position where the width W in the peripheral direction PD is largest, each of the intervals I between the flexible portions 135 is preferably from 0.2 to 12 mm, more preferably from 0.5 to 5 mm. When the element is, for example, an 8-inch element, each of the intervals is preferably from 0.2 to 25 mm, more preferably from 0.5 to 10 mm. When the element is, for example, a 16-inch element, each of the intervals is preferably from 0.2 to 70 mm, more preferably from 0.5 to 30 mm. The interval I is a value measured as the direct distance therebetween.

The length L1 of the flexible portions 135 is preferably from 5 to 50 mm, more preferably from 20 to 35 mm.

When the cover moiety 132 is formed, the length L2 thereof is preferably from 1 to 20 mm, more preferably 5 to 10 mm. The thickness of the cover moiety 132 is preferably from 0.2 to 2 mm, more preferably from 0.5 to 1.5 mm.

Other Embodiments (1) In the present invention, each of its end members is not limited to an end member having a sectional shape as illustrated in FIG. 4. Thus, the end member may be an end member having a shape that may be of various types as illustrated in FIGS. 5(a) to (e).

Figure 5A:
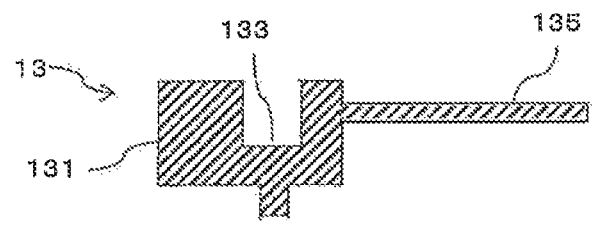
FIGS. 5(a) to 5(e) are each a vertically sectional view illustrating another example of the membrane element end member.

In an example illustrated in FIG. 5(a), in an end member 13, flexible portions 135 having, in their outer peripheral side surface, neither convexities nor concavities are formed. In this example, the flexible portions 135 are fitted to a main body 131 to interpose no cover moiety 132 therebetween.

Figure 5B:
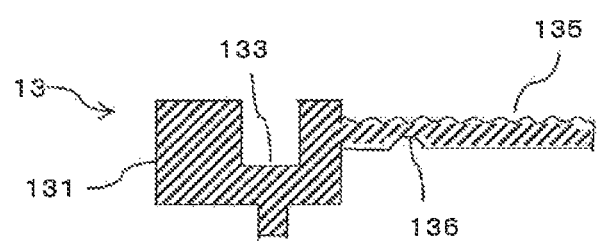

In an example illustrated in FIG. 5(b), an end member has, in its inner peripheral side surface, a concavity stripe extended in the peripheral direction PD. Consequent the end member has a small-thickness portion 136 nearer to the base end of each of the flexible portions 135 than to the other end from the center of the flexible portion in the axial line direction A of the flexible portion, the radius direction RD thickness t of this small-thickness portion being smaller than that of the other. The setup of this small-thickness portion 136 makes it possible to make the flexibility of the flexible portions higher in the radius direction RD. Furthermore, in accordance with the position of the formed small-thickness portion 136, the shape of the flexible portions is adjustable in the state that the portions are deformed.

Figure 5C:
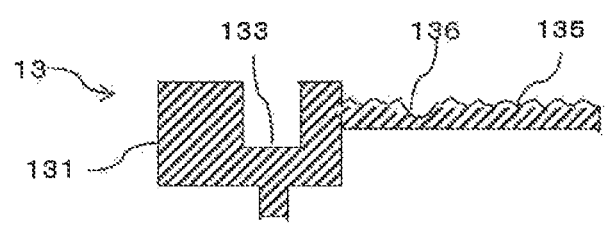

In an example illustrated in FIG. 5(c), an end member has, in its outer peripheral side surface, a concavity stripe extended in the peripheral direction PD. Consequently, the end member has a small-thickness portion 136 nearer to the base end of each of the flexible portions 135 than to the other end from the center of the flexible portion in the axial line direction A of this portion, the radius direction RD thickness t of this small-thickness portion being smaller than that of the other.

Figure 5D:
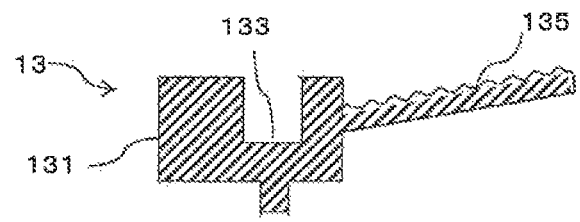

In an example illustrated in FIG. 5(d), in an end member 13, flexible portions 135 are formed, the tips of which are spread toward the outer periphery in the radius direction RD. In this example, the whole of the flexible portions 135 are spread toward the outer periphery. However, the flexible portions 135 may be partially spread toward the outer periphery. A notch may be fitted to the tip of any flexible portion, the tip side of this portion being not spread toward the outer periphery in the radius direction RD, out of the flexible portions 135, so as to spread the portion toward the outer periphery.

Figure 5E:
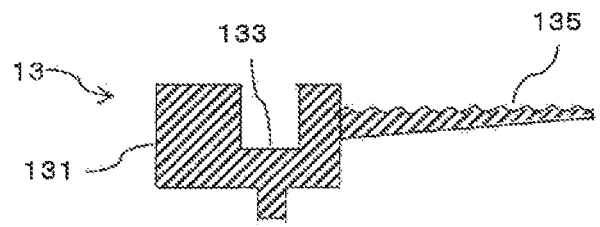

In an example illustrated in FIG. 5(e), in an end member 13, flexible portions 135 are formed, the thickness of which is made smaller toward the tips of these portions. In this case, the inner peripheral side surfaces of the flexible portions 135 are spread toward the outer periphery in this example. However, the inner peripheral side surfaces of the flexible portions 135 may be spread toward the outer periphery.

(2) In the present invention, the flexible portions are not limited to flexible portions having shapes as illustrated in FIG. 4. Thus, the flexible portions may be flexible portions having shapes that may be of various types as illustrated in FIGS. 6(*a*) to (*f*) and FIGS. 7(*a*) to (*f*).

Figure 6:
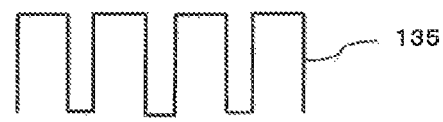
FIGS. 6(a) to 6(f) are each a developed plan view illustrating another example of flexible portions of the membrane element end member.
Figure 6:
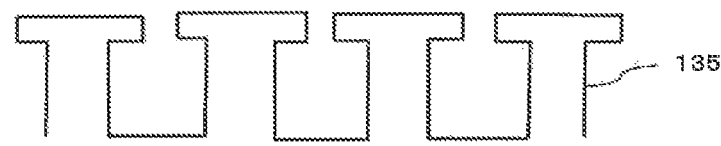
Figure 6:
Figure 6:
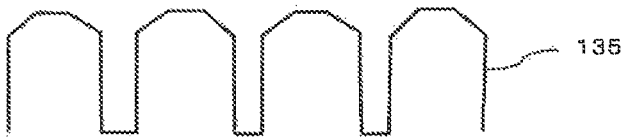
Figure 6:
Figure 6:
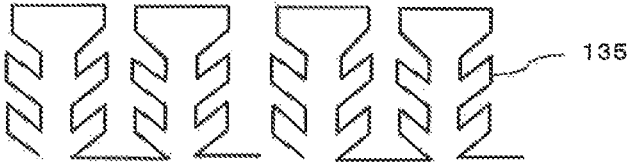

In an example illustrated in FIG. 6(*a*), rectangular flexible portions 135 are formed in the state that the respective width thereof are each larger than each of intervals between the flexible portions 135.

In an example illustrated in FIG. 6(*b*), flexible portions 135 are formed which each have a rectangular large-width region to make their tips widest. It is preferred in the present invention that in this way, respective sides of the flexible portions that are positioned at the tips are parallel to the peripheral direction PD.

In an example illustrated in FIG. 6(*c*), flexible portions 135 are formed which each have a trapezoidal large-width region to make their tips widest. In this way, in the present invention, the shape of the flexible portions that are positioned at the tips may be any shape.

In an example illustrated in FIG. 6(*d*), hexagonal flexible portions 135 are formed to make their tips narrowest. In this way, in the present invention, the shape of the whole of each of the flexible portions 135 may be any shape.

In an example illustrated in FIG. 6(*e*), flexible portions 135 are formed which each have branches spread from their rectangular trunk to both sides of the trunk. In this example, the trunk has, at its tip, a hexagonal tip region. The branches are inclined towards the tip. However, the branches may be inclined in any direction. In this way, the flexible portions each have branches spread toward both the sides of the trunk, whereby when the exterior member is formed, the formation can be evenly attained.

In an example illustrated in FIG. 6(*f*), flexible portions 135 are formed which each have branches spread from their rectangular trunk to both sides of the trunk. In this example, the trunk has, at its tip, a pentagonal tip region.

Figure 7:
FIGS. 7(a) to 7(f) are each a developed plan view illustrating still another example of the flexible portions of the membrane element end member.
Figure 7:
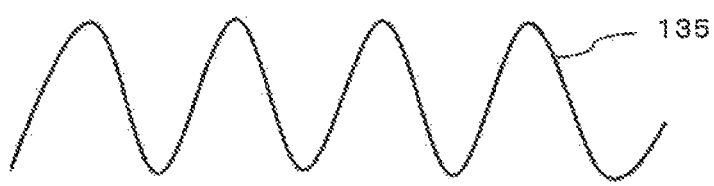
Figure 7:
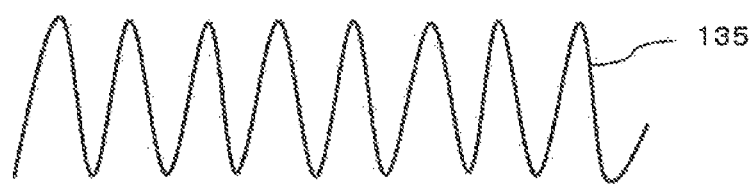
Figure 7:
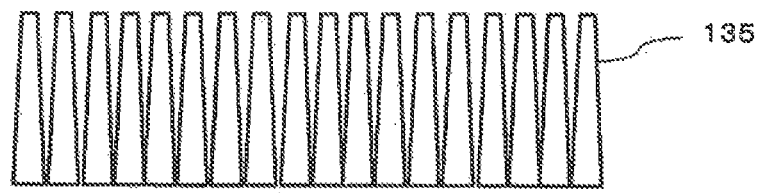
Figure 7:
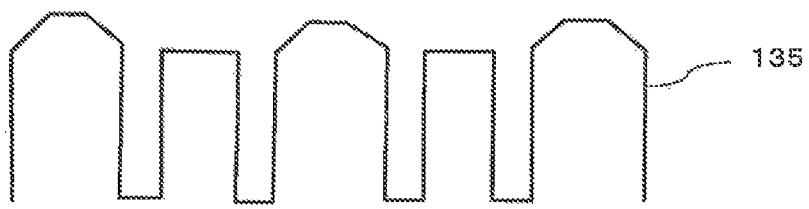
Figure 7:

In an example illustrated in FIG. 7(*a*), respective tips of flexible portions 135 are smallest in width, and a small-width region is fitted to each of the flexible portions nearer to the base end of the flexible portion than to the other end from the center thereof in the axial line direction A. The small-width region is a region smaller in peripheral-direction-PD-width than the other region.

In an example illustrated in FIG. 7(*b*), flexible portions 135 which each have a substantially triangular shape having no acute-angle corner are formed to make their tips narrowest. In this example, the base ends of the flexible portions 135 are connected to each other. In the present invention, however, such a form is also defined as a form of having plural flexible portions 135.

In an example illustrated in FIG. 7(*c*), flexible portions 135 which each have a substantially triangular shape having no acute-angle corner are formed to make their tips narrowest, and the number of the flexible portions 135 is larger than that in the example illustrated in FIG. 7(*b*).

In an example illustrated in FIG. 7(*d*), trapezoidal flexible portions 135 are formed to make their tips narrowest. The flexible portions 135 having such a shape make it possible that when the exterior member is formed, the formation is evenly attained.

In an example illustrated in FIG. 7(*e*), rectangular flexible portions 135 and pentagonal flexible portions 135 are alternately formed. In this example, the two species of the flexible portions 135 are different from each other in length.

In an example illustrated in FIG. 7(*f*), flexible portions 135 are formed in each of which a narrow trapezoid near the main body 131 and a wide pentagon near the tip are continuously linked to each other. It is preferred in the present invention that in this way, the flexible portions 135 each have a small-thickness portion nearer to the base end of the flexible portions than to the other end from the center of the flexible portion in the axial line direction A, the width W of the peripheral direction PD thickness t of this small-thickness portion being smaller than that of the other. The setup of such a small-width region makes it possible to make the flexibility of the flexible portions higher in the radius direction RD.

(3) In the above-mentioned embodiment, an example has been demonstrated in which the connecting portion 131*c* for linking the circular portions 131*b* forms the openings 131*a* in the main body 131 by the connecting portion 131*c* in which ribs are formed in a plate-form body having many circular holes. In the present invention, however, the openings 131*a* in the main body 131 may have any shape. The main body has, for example, a connecting portion 131*c* in a spoke form, whereby openings 131*a* through which a liquid can flow may be made in the main body 131.

(4) In the above-mentioned embodiment, an example has been demonstrated in which the main body 131, the flexible portions 135, and the cover moiety 132 are made of the same material and further be integrated with each other. However, these may be made of different materials. For example, the flexible portions 135 may be made of a highly flexible (more flexible) resin to be integrated with any other portion, or the two portions may be shaped and then bonded to each other. Moreover, it is allowable to constitute the flexible portions 135 by a spring made of metal, and embed the base end thereof in the main body 131 or the cover moiety 132 to form the flexible portions 135.

(5) In the above-mentioned embodiment, an example of a case has been demonstrated where the end members have convexities and concavities to extend grooves in the peripheral direction PD. However, the shape, and the size of the convexities and concavities, the intervals therebetween, and other factors may be selected at will. For example, plural convexities may be formed, the shape of each of which is, for example, a circular, triangular or rectangular shape as viewed in plan.

(6) In the above-mentioned embodiment, an example has been demonstrated in which the circularly continuous cover moiety 132 is formed. However, plural cover moieties 132 separated from each other may be formed.

(7) In the above-mentioned embodiment, an example has been demonstrated in which the adhesive-having glass fiber (glass fiber roving) is used to form the FRP exterior member. However, other exterior members may be used. Preferred is however a fiber reinforced resin, which is reinforced with a reinforcing fiber, such as a glass fiber, a ceramic fiber or a high-elastic-modulus resin fiber.

The form of the reinforcing fiber is, for example, a multifilament fiber, or a monofilament fiber; or a woven fabric, a nonwoven fabric, a kitting, a net or some other fabric made of the fiber. In an FRP exterior member made of such a fabric, filaments of its reinforcing fiber are in the state of being made continuous in the peripheral direction or in a direction inclined from the peripheral direction, and being embedded in a solidified adhesive.

DESCRIPTION OF REFERENCE SIGNS

10: Membrane element
11: Membrane wound body
12: Separating membrane
13: End member
131: Main body
131a: Opening
131b: Circular portion
132: Cover moiety
135: Flexible portion
14: Permeation-side flow-channel matter
15: Exterior member
16: Membrane member
18: Supply-side flow channel matter
20: Central pipe
40: Pressure resistant vessel
50: Membrane filtration apparatus

The invention claimed is:

1. A membrane element comprising a central pipe having, in its outer periphery, holes; a membrane wound body in which a membrane member is wound on the central pipe; end members arranged, respectively, at both ends of the membrane wound body; and an exterior member fitted to at least an outer periphery of the membrane wound body,
wherein the exterior member includes a fiber reinforced resin having a reinforcing fiber wound on the outer periphery of the membrane wound body;
the end members each includes a main body having an opening through which a liquid can flow, and plural flexible portions extended from the main body toward the membrane wound body; and
the reinforcing fiber is wound also onto an outer periphery of the flexible portions in a state that the flexible portions are deformed toward an outer peripheral surface of the membrane wound body.

2. The membrane element according to claim 1,
wherein the main body of each of the end members has a cover moiety which covers an end of the membrane wound body, and which has a larger inside diameter than an outside diameter of the membrane wound body, and
further the flexible portions are extended from the cover moiety.

3. The membrane element according to claim 1, wherein the flexible portions have, at their outer peripheral side surface, a convexity and concavity.

4. The membrane element according to claim 3, wherein the convexity and concavity are a groove extended in a peripheral direction.

5. The membrane element according to claim 1, wherein intervals between the flexible portions are each smaller than a width of each of the flexible portions in a peripheral direction thereof.

6. The membrane element according to claim 1, wherein the flexible portions are arranged at 10 sites or more at substantially regular intervals.

7. A membrane element end member which is used in the membrane element recited in claim 1, comprising
a main body having an opening through which a liquid can flow, and plural flexible portions extended from the main body toward the membrane wound body.

8. A membrane element end member which is arranged at an end of a spiral membrane element, comprising
plural flexible portions extended toward a membrane wound body of the membrane element.

9. The membrane element end member according to claim 8, wherein a main body of the end member has a cover moiety which covers an end of the membrane wound body, and which has a larger inside diameter than an outside diameter of the membrane wound body, and
further the flexible portions are extended from the cover moiety.

10. The membrane element end member according to claim 8, wherein the flexible portions have, at their outer peripheral side surface, a convexity and concavity.

11. The membrane element end member according to claim 10, wherein the convexity and concavity are a groove extended in a peripheral direction.

12. The membrane element end member according to claim 8, wherein intervals between the flexible portions are each smaller than a width of each of the flexible portions in a peripheral direction thereof.

13. The membrane element end member according to claim 8, wherein the flexible portions are arranged at 10 sites or more at substantially regular intervals.

14. A membrane element end member which is used in the membrane element recited in claim 2, comprising
a main body having an opening through which a liquid can flow, and plural flexible portions extended from the main body toward the membrane wound body.

15. A membrane element end member which is used in the membrane element recited in claim 3, comprising
a main body having an opening through which a liquid can flow, and plural flexible portions extended from the main body toward the membrane wound body.

16. A membrane element end member Which is used in the membrane element recited in claim 4, comprising
a main body having an opening through which a liquid can flow, and plural flexible portions extended from the main body toward the membrane wound body.

17. A membrane element end member which is used in the membrane element recited in claim 5, comprising
a main body having an opening through which a liquid can flow, and plural flexible portions extended from the main body toward the membrane wound body.

18. A membrane element end member which is used in the membrane element recited in claim 6, comprising
a main body having an opening through which a liquid can flow, and plural flexible portions extended from the main body toward the membrane wound body.

* * * * *